United States Patent [19]

Whiteside

[11] Patent Number: 5,179,341
[45] Date of Patent: Jan. 12, 1993

[54] SYSTEM AND METHOD FOR DETECTING AN IMPROPER TERMINATION AND A SHORT CIRCUIT IN A NETWORK

[75] Inventor: Charles H. Whiteside, Colorado Springs, Colo.

[73] Assignee: Hewlett-Packard Company, Palo Alto, Calif.

[21] Appl. No.: 723,100

[22] Filed: Jun. 28, 1991

[51] Int. Cl.⁵ ..................... G01R 31/08; G01R 31/11
[52] U.S. Cl. ................................... 324/523; 324/522; 324/527; 324/534; 324/543; 370/13; 340/825.16
[58] Field of Search ............... 324/522, 523, 524, 527, 324/534, 543, 544; 370/13, 17; 379/93, 94, 95; 340/825.16

[56] References Cited

U.S. PATENT DOCUMENTS

| | | | |
|---|---|---|---|
| 4,110,572 | 8/1978 | Cochrane | 324/527 X |
| 4,380,088 | 4/1983 | Lipcon | 370/13 X |
| 4,484,030 | 11/1984 | Gavrilovich | 340/825.16 |
| 4,547,633 | 10/1985 | Széchényi | 370/13 |
| 4,797,901 | 1/1989 | Goerne et al. | 370/85.1 X |
| 4,817,080 | 3/1989 | Soha | 370/17 |
| 4,841,520 | 6/1989 | Steely | 370/13 |
| 4,931,791 | 6/1990 | Mallard, Jr. | 340/825.16 X |

Primary Examiner—Jack B. Harvey
Assistant Examiner—Glenn W. Brown

[57] ABSTRACT

A system and method for detecting an improperly terminated network for networks using a collision detection access scheme. Embodiments of the present invention also contemplate a system and method for detecting a short circuit in a network. For detecting both an improperly terminated network and a short circuit in a network, the present invention relies on the detection of certain changes in the voltage of the network.

17 Claims, 7 Drawing Sheets

SYSTEM AND METHOD FOR DETECTING AN IMPROPER TERMINATION AND A SHORT CIRCUIT IN A NETWORK

BACKGROUND OF THE INVENTION

1. Field Of The Invention

The present invention provides a system and method for non-intrusively detecting whether a network (which uses a collision detection access scheme) is open at one of its ends. In addition, the present invention also provides a system and method for detecting whether there is a short circuit (i.e., a shorted termination) in the network.

2. Related Art

Networks which link otherwise separate computers and other related devices (such as printers) together have become very popular, and in some cases are even a necessity to some companies. One type of popular network uses an access scheme known as collision detection to facilitate communication. The principle behind this scheme is that all of the separate computers or related devices (hereafter referred to as "devices") are connected to a network bus having at least two termination points. When one device is to communicate with another, it sends an "information packet" out onto the bus. This information packet contains such information as the destination device address, the sending device address and the data to be passed. In typical collision detection schemes, when an information packet is sent onto the bus (and propagates along the bus), a negative voltage is propagated.

In a collision detection access scheme, a device will send an information packet onto the network bus after first checking the network bus to make sure that no other information packets are being sent. After it detects that none are being sent, the device will also typically wait some specified period of time to make sure that an information packet is not about to be sent by another device. If the device does not believe that an information packet is about to be sent, it will send its information packet on to the bus.

Even with all the checking discussed above, however, it is still possible that more than one device will send an information packet substantially simultaneously. If this occurs, a "collision" is said to be the result. Since both information packets were sent out simultaneously, the negative voltage on the network bus will be greater (typically double) than it would have been if only a single device had sent one information packet. The result is that the data within the information packets involved in the collision are corrupted. Each device then retransmits its information packet at a slightly different time in order to avoid another collision.

On a network using a collision detection access scheme, the network bus must be properly terminated at all of its ends with a "terminator" of the same impedance as the conduction media of the network bus. Otherwise, the network will not work properly. In fact, the information packets (which are represented as a negative voltage having an AC component) will propagate in both directions on the data bus, and when this propagation comes to an improperly terminated end, it will propagate back the other way in a "constructive" manner. In other words, the voltage will typically increase to about double that of a normal information packet. Thus, it will appear as though a collision occurred.

The effect of an unterminated network can be seen from FIG. 2. Referring now to FIG. 2, at time (T) =0 a transmission occurs on the data bus. The left portion of the data bus is terminated by some impedance (as indicated by the greek letter Omega), whereas the right side is not. At T =0, a transmission (i.e. an information packet) is emitted at the transmission point shown. In this example, this transmission is shown to be minus one volt. At T =1, the −1 volts has propagated in both directions along the data bus. At T =2, the voltage has reached the end of the data bus having impedance, and no additional propagation occurs. However, on the right portion of the data bus where there is infinite impedance, the propagation reverses itself, and −2 volts begins to propagate in the other direction. By T =6, the entire data bus is at −2 volts. Thus, when this occurs, any information packet which is transmitted on the network will create −2 volts (or at least substantially more voltage than would be the normal case where the network was properly terminated) and thus all information packets will appear to have had a collision. Because of this, an improperly terminated network can cause serious problems.

Another problem which can occur on a network having a collision detection access scheme is a shorted termination. This means that the network bus has a short circuit. This typically results in an information packet appearing to have a positive peak voltage. In other words, the greatest flux of voltage created as a result of an information packet being sent by a device will be positive rather than negative. This can cause serious trouble in a network, since a large percentage of data errors can occur.

The magnitude of problems caused by either an improperly terminated endpoint of a network bus or else a short circuit can be appreciated from FIG. 1. Referring to FIG. 1, an example of a network set-up is shown, where devices labeled PC (for "personal computer") and WS (for "work station") are shown attached to a complex network. As can be seen, there are many endpoints involved with this network. If the impedance of these endpoints is not proper (i.e., an endpoint impedance terminator such as one at the ends of network segment 102 is removed) then if a device on the network transmits an information packet, it will appear to have had a collision, and will thus be discarded.

In typical networks such as the one contemplated by the example of FIG. 1, all devices of network segments which are connected via a repeater (such as network segments 102 and 112 connected by repeater 110) would be affected by an improper termination such as the one described above. Thus, for example, if one of the endpoints of the network segment 102 was improperly terminated, it would affect devices as far away as work station 136. The same is true if there were a short circuit somewhere in network segment 102. However, devices such as the bridge 140 would not propagate such a problem past that point. Nonetheless, such problems in a network environment can have serious and far-reaching repercussions.

Trouble shooting a network with such difficulties as discussed above requires many levels of tests before the actual problem is typically identified. Generally, a problem is identified using test devices such as Protocol Analyzers, Multimeters and Time Domain Reflectometers. When a problem in a network is suspected to be caused by an improper termination, tests are conventionally done which require the transmission of additional information packets onto the network. The same is true when the problem is suspected to be a shorted network. However, transmitting such additional information packets can potentially be detrimental to accurate testing of the network in that the time that it takes to generate these additional packets detracts from the observation functions of the test devices.

Thus, a need exists for non-invasive determination of improper termination and short circuits within networks.

SUMMARY OF THE INVENTION

The present invention overcomes the deficiencies discussed above by providing a system and method for non-intrusively detecting whether a network (which utilizes a collision detection access scheme) is not properly terminated. Since an improperly terminated network causes all information packets on a network to appear as though they have been in a collision, the present invention keeps a count of all information packets which appear to have been in a collision, and also keeps a count of the total number of information packets generally that it detects on the network. If these two counts are the same (after some specified period of time), this means that the network is not properly terminated.

The present invention also accounts for the situation where no devices are transmitting on the network, and thus there are no information packets for the present invention to detect at all. To account for this situation, the present invention waits for a specified period of time, and if it detects no information packets of any kind, it transmits its own information packets. The present invention then keeps track of the number of information packets which have been in a collision, and the total number of information packets detected as discussed above. Again, if these two numbers are the same then the network is not properly terminated. Since no information packets were previously transmitted by any devices, intrusiveness is not an issue.

Embodiments of the present invention also contemplate that a short circuit can be detected in the network in a non-intrusive manner. This is because a short circuit would cause all information packets to have a positive peak voltage. Thus, these embodiments of the present invention keep a count of all information packets having a positive peak voltage and also of the total number of information packets detected. If these two counts are equivalent, then this means that there is a short circuit in the network.

Some embodiments of the present invention contemplate that portions of the mechanism for detecting an improperly terminated network can advantageously be used as part of the mechanism for detecting a short circuit in the network.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE INVENTION

I. Overview

The present invention provides a system and method for non-intrusively detecting whether a network (which uses a collision detection access scheme) has been improperly terminated (i.e., open at some end). In addition, the present invention also provides a system and method for detecting whether there is a short circuit (i.e., a shorted termination) in the network.

More specifically, the present invention detects whether some portion of a network has been improperly terminated by detecting whether there is a constant excess of negative voltage on the network. This would indicate that some portion of the network has not been properly terminated. Since a voltage drop is also an indication that a collision between information packets has occurred, any type of device used to detect collisions by detecting a voltage drop can also be utilized to detect if the network is improperly terminated. Specifically, if the total number of information packets appearing on the network over some specified period of time are equal to the number of information packets which appear to have been "damaged" due to a collision, it can be concluded that the network is not properly terminated. The present invention facilitates such a comparison.

Some embodiments of the present invention also account for the situation where no information packets are being transmitted on the network due to the fact that all devices on the network have timed-out (that is, stopped trying to transmit) because of the faulty network. Where this is the case, the present invention will transmit its own information packets onto the network, and then detect whether all of these information packets appear as collisions. Since no information packets were previously transmitted by any devices, intrusiveness is not an issue.

In detecting whether a short circuit exists on the network, embodiments of the present invention contemplate a device for detecting whether an information packet has a positive peak voltage. If all information packets (sampled over a specified period of time) have a positive peak voltage, this means that there is a short circuit in the network. Some of these embodiments contemplate using some of the same mechanisms to count the total number of information packets as are used in the previously mentioned embodiments. In any event, if the total number of information packets detected is the same as the number of information packets having a positive peak voltage, this means that the network has a short circuit.

II. Detection Of Improperly Terminated Network

Figure 1:
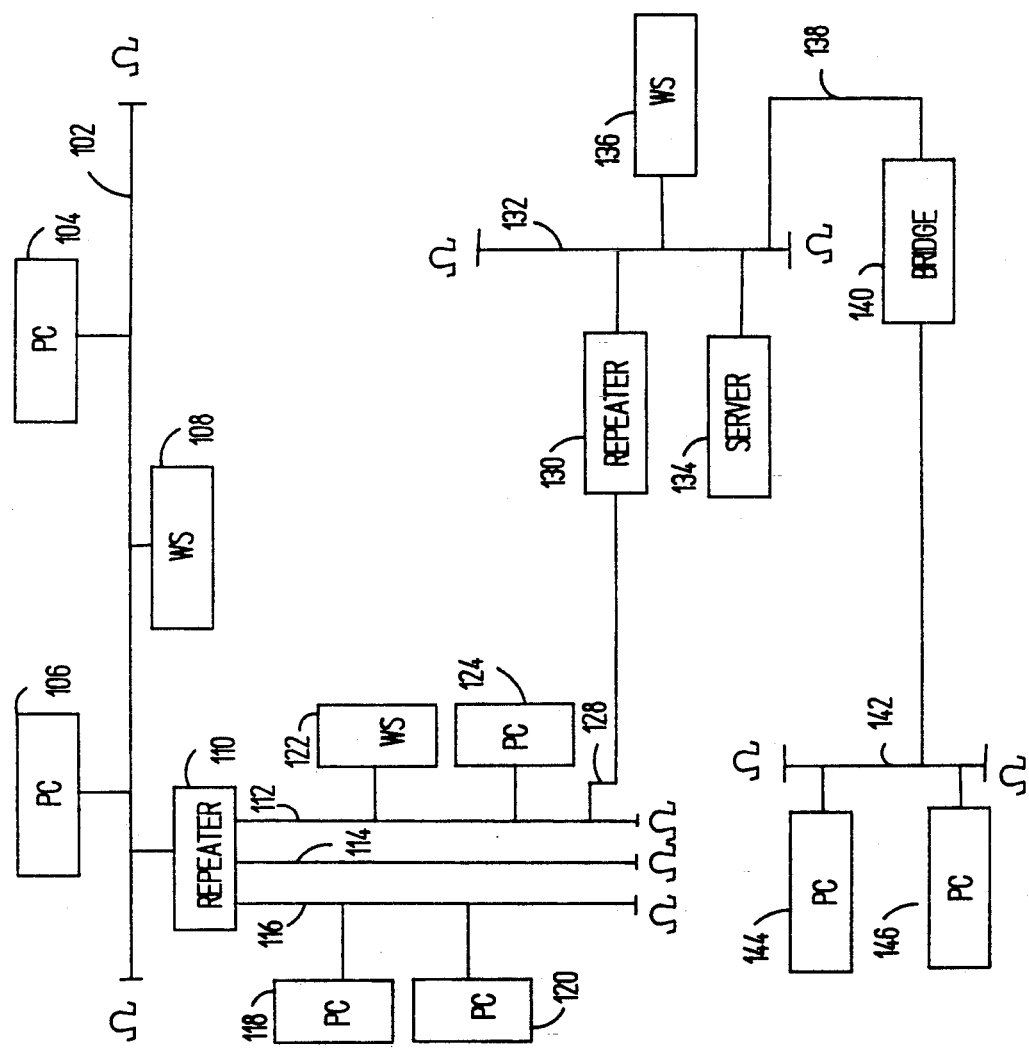
FIG. 1 is a diagram of an example of a network configuration as contemplated by embodiments of the present invention.
Figure 2:
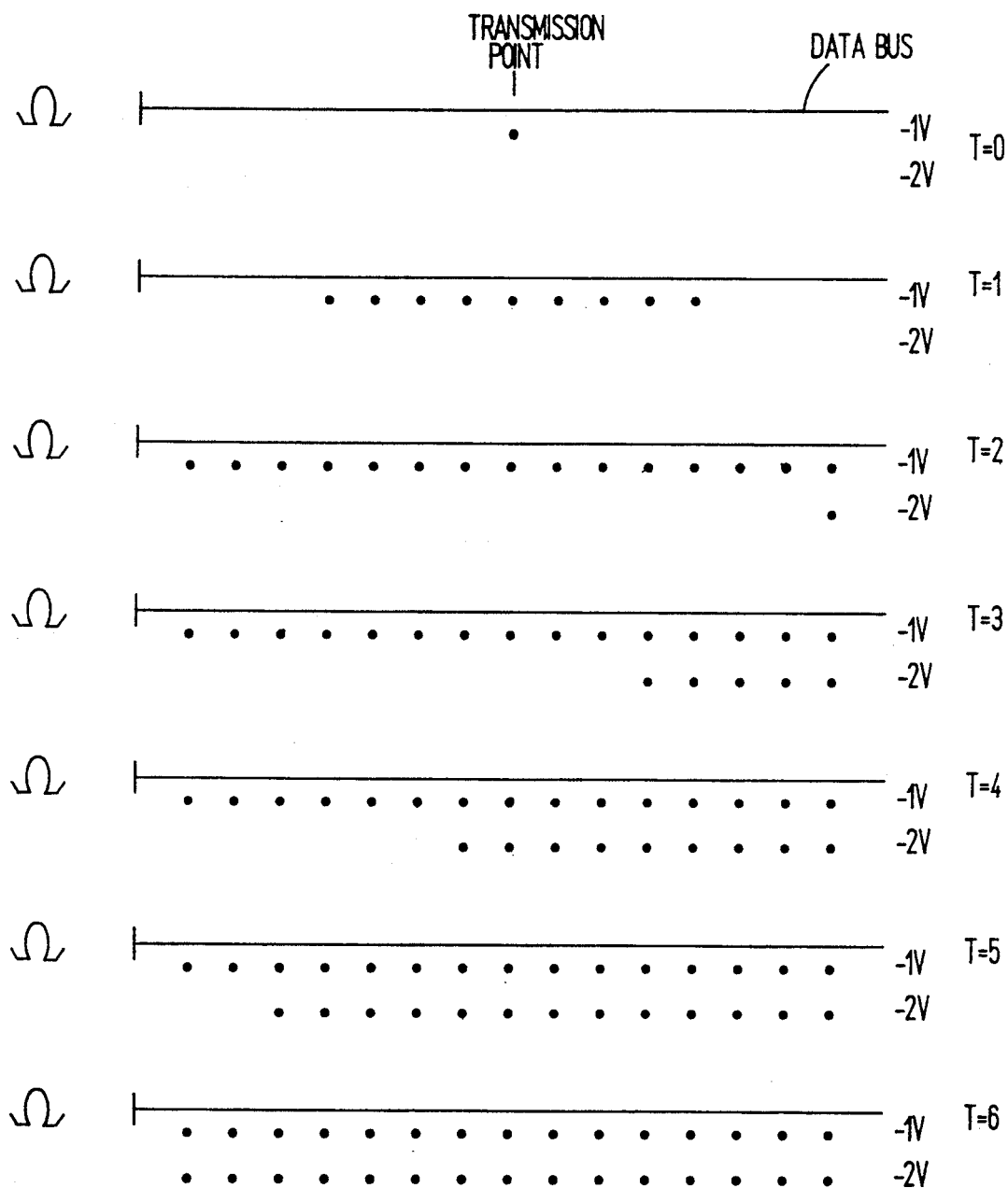
FIG. 2 is a diagram demonstrating the results of an improperly terminated network.
Figure 3:
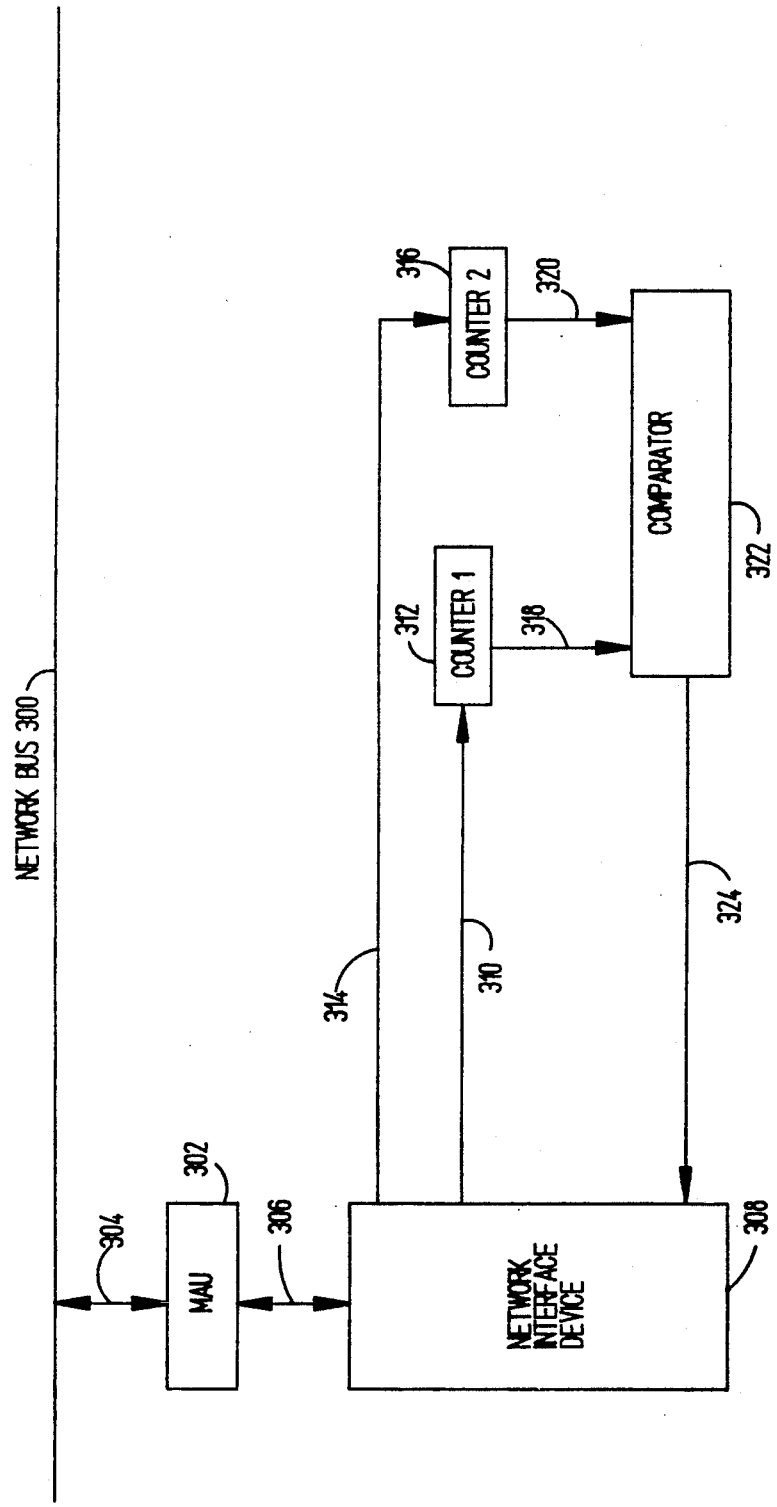
FIG. 3 is a high-level block diagram of embodiments of the present invention for detecting an improperly terminated network.

Embodiments of the present invention can best be explained with regard to FIG. 3. Referring now to FIG. 3, a network bus 300 is shown which is contemplated to utilize some type of collision detection access scheme. The present invention accesses this network bus 300 using a data line 304. This data line 304 is attached to a Medium Access Unit (MAU) 302, which has a number of functions. In general, it is contemplated that the MAU 302 receives signals from the network bus 300 and can 1) detect whether an information packet has appeared on the network bus 300 at the point accessed by the present invention (by determining whether a specified voltage drop has occurred), 2) determine whether a collision has occurred between information packets on the network bus 300 (by detecting whether an even greater voltage drop has occurred on the network bus 300) and 3) transmit data onto the network bus 300.

The MAU 302 can generate and receive signals based upon the above-noted functions. Signals generated by the MAU 302 indicating that an information packet or a collision has been detected are sent to a network interface device 308 via a data line 306. Embodiments of the present invention contemplate that the network interface device 308 interprets these signals for use by the remainder of the present invention.

If the network interface device 308 receives a signal from the MAU 302 indicating that an information packet has appeared on the network bus 300 (at the point accessed by the present invention), then a signal will be sent along data line 310 to a counter 312, indicating that this counter should be incremented by 1. Also, if a collision is detected by MAU 302, then network interface device 308 will send a signal along data line 314 to a counter 316, indicating that this counter should be incremented by 1. Thus, the network interface device 308 serves to increment these counters.

After some specified period of time, a comparator 322 will compare counter 1 (312) and counter 2 (316), using data lines 318 and 320, respectively. Embodiments of the present invention contemplate that this specified period should be long enough so that a properly working network will pass a sufficient number of information packets by the present invention on network bus 300.

If the comparator 322 finds that counter 1 (312) and counter 2 (316) are identical (and not equal to zero), this means that every one of the information packets appeared to have a collision. Since it is so unlikely that this would happen in any properly functioning (and reasonably designed) network, this would most likely mean that the network is improperly terminated. Embodiments of the present invention contemplate that a user is given some type of "open" signal to indicate that the network is open (that is, not properly terminated).

It may be the case, however, that all of the devices that are attached to an improperly terminated network bus will stop sending any type of information packets after a very short period of time. This is likely to happen where, after a number of tries, the devices are not able to communicate with any other devices on the network, and consequently these devices just time-out (i.e.. shut down). Embodiments of the present invention take care of this situation by providing a kind of "backup check" and directing the comparator 322 to examine counter 1 (312) after some specified period of time. If counter 1 (312) is zero after that time has elapsed, this means that no information packets have passed by the present invention on the network bus 300.

If no information packets have been detected, the comparator 322 sends a signal to the network interface device 308 via a data line 324 to initiate the sending of information packets to the network bus 300. These data packets are then put onto the network bus 300 by the MAU 302, and the network bus 300 is again checked to determine the number of collisions and information packets. As before, the MAU 302 sends appropriate signals to the network interface device 308 which will increment the appropriate counters. If counter 1 (312) is equal to counter 2 (316), as determined by the comparator 322, this means that the network is improperly terminated.

Embodiments of the present invention contemplate that the counter 1 (312) and counter 2 (316) could be any device capable of maintaining numeric values, including Random Access Memory (RAM), registers and flip-flops. The network interface device 380 and MAU 302 could be replaced with a single node card, such as a 3Com 3C501 by 3Com Corporation of Santa Clara, CA.

Figure 4A:
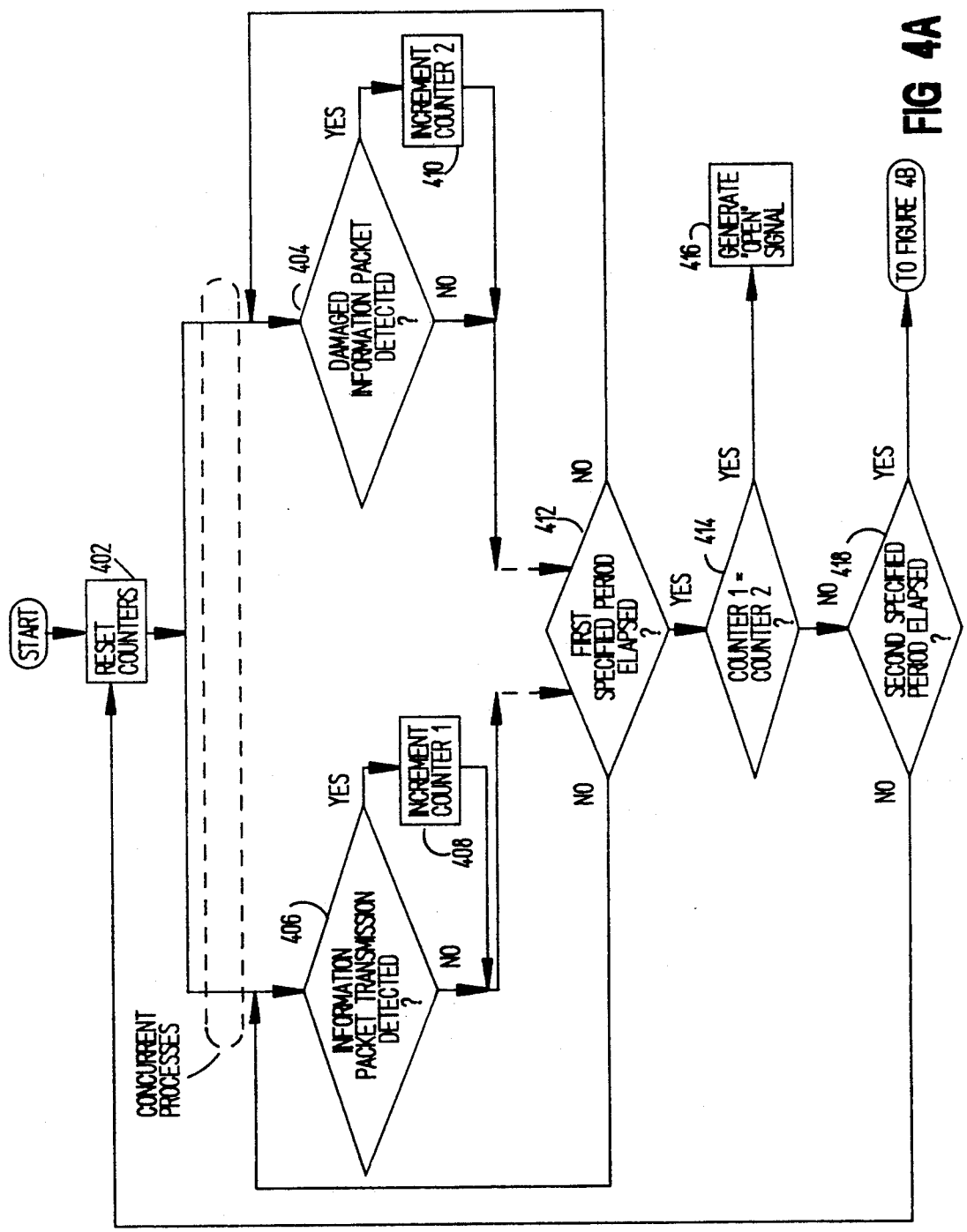
FIGS. 4A and 4B flowchart of embodiments of the present invention for detecting an improperly terminated network.
Figure 4B:
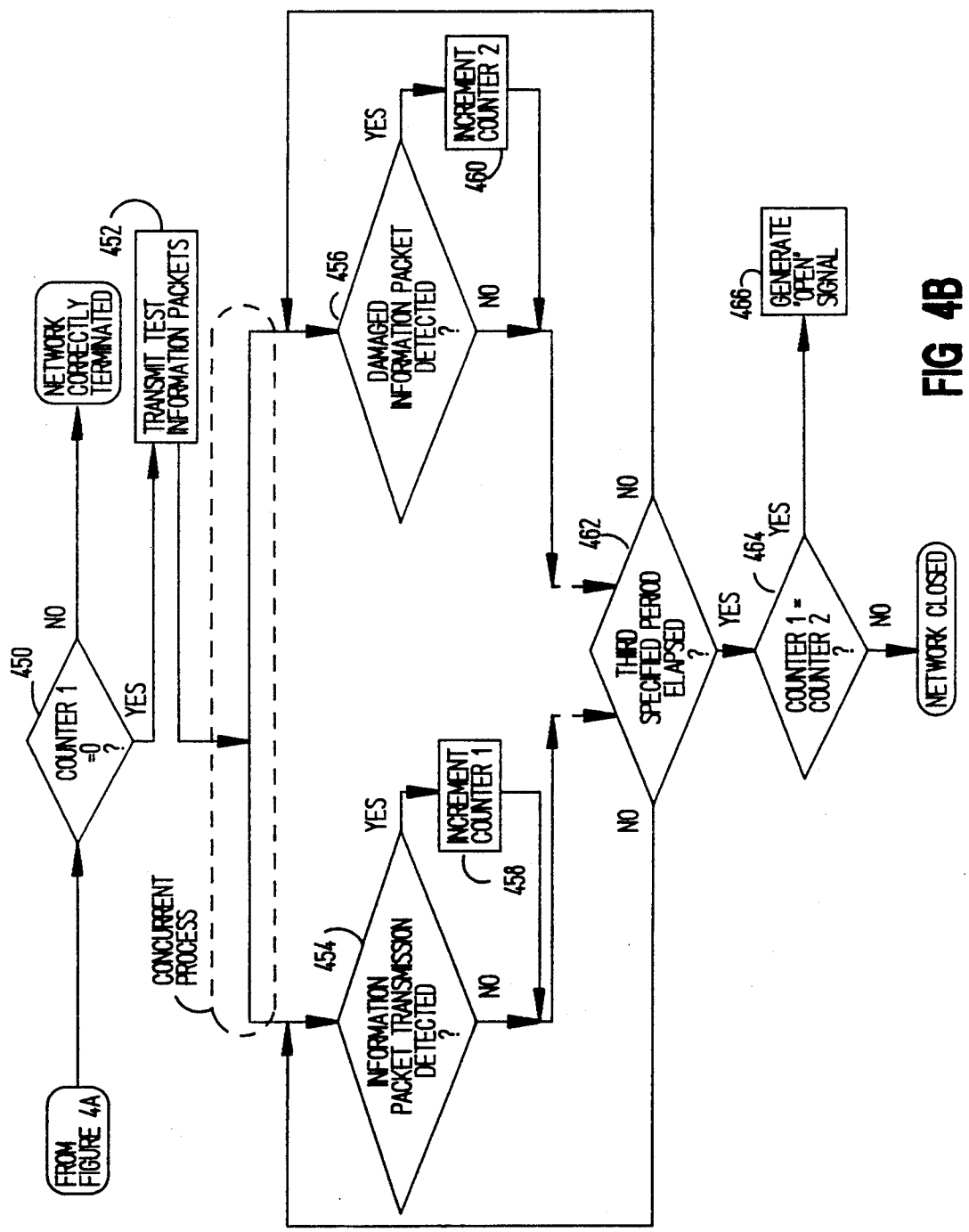

Embodiments of a method of operation of the present invention are described using the flowchart of FIGS. 4A and 4B. Referring first to FIG. 4A, the present invention is initiated, as indicated by the oval mark "start." The counters are reset as indicated by a block 402. The present invention then detects the various signals which are passed by it over the network bus 300. If an information packet transmission is detected, then counter 1 (312) is incremented, as indicated by a decision block 406 and a block 408. Concurrently, if a damaged information packet (appearing as a "collision") is detected, then counter 2 (316) is incremented as indicated by a decision block 404 and a block 410.

The present invention continually will detect information packets and damaged information packet transmissions until a first specified period has elapsed. This is indicated by a block 412. Once this specified period has finally elapsed, a determination is made as to whether counter 1 (312) and counter 2 (316) are identical (and greater than zero). This is indicated by a decision block 414. If these two counters are identical, then an "open" signal is generated as indicated by a block 416. However, if counter 1 (312) does not equal counter 2 (312), then the present invention then determines if a second specified period has elapsed, as indicated by a decision block 418. If this second specified period has not elapsed, then the counters are reset, as indicated by block 402, and the process described above continues.

If this second specified period has elapsed, then the remainder of the operation is described by FIG. 4B. Referring now to FIG. 4B, a determination is made as to whether counter 1 (312) is equal to zero, a indicated by a decision block 450. If it is not equal to zero, that means that there have been some information packet transmissions on the network bus 300 (although not equal to the number of collisions detected), and thus the network is properly terminated.

If counter 1 does equal zero, then the present invention will transmit test information packets onto the network bus 300, as indicated by a block 452. Again, the present invention will count the number of information packet transmissions detected concurrently with detection of damaged information packets. Counter 1 (312) and counter 2 (316) will be incremented as described above.

After a third specified period of time has elapsed, as indicated by a decision block 462, a determination is then made whether counter 1 is (greater than zero and) equal to counter 2, as indicated by a decision block 464. If the answer is "yes," then an "open" signal is generated, as indicated by a block 466. Otherwise, the network is considered correctly terminated.

Figure 5:
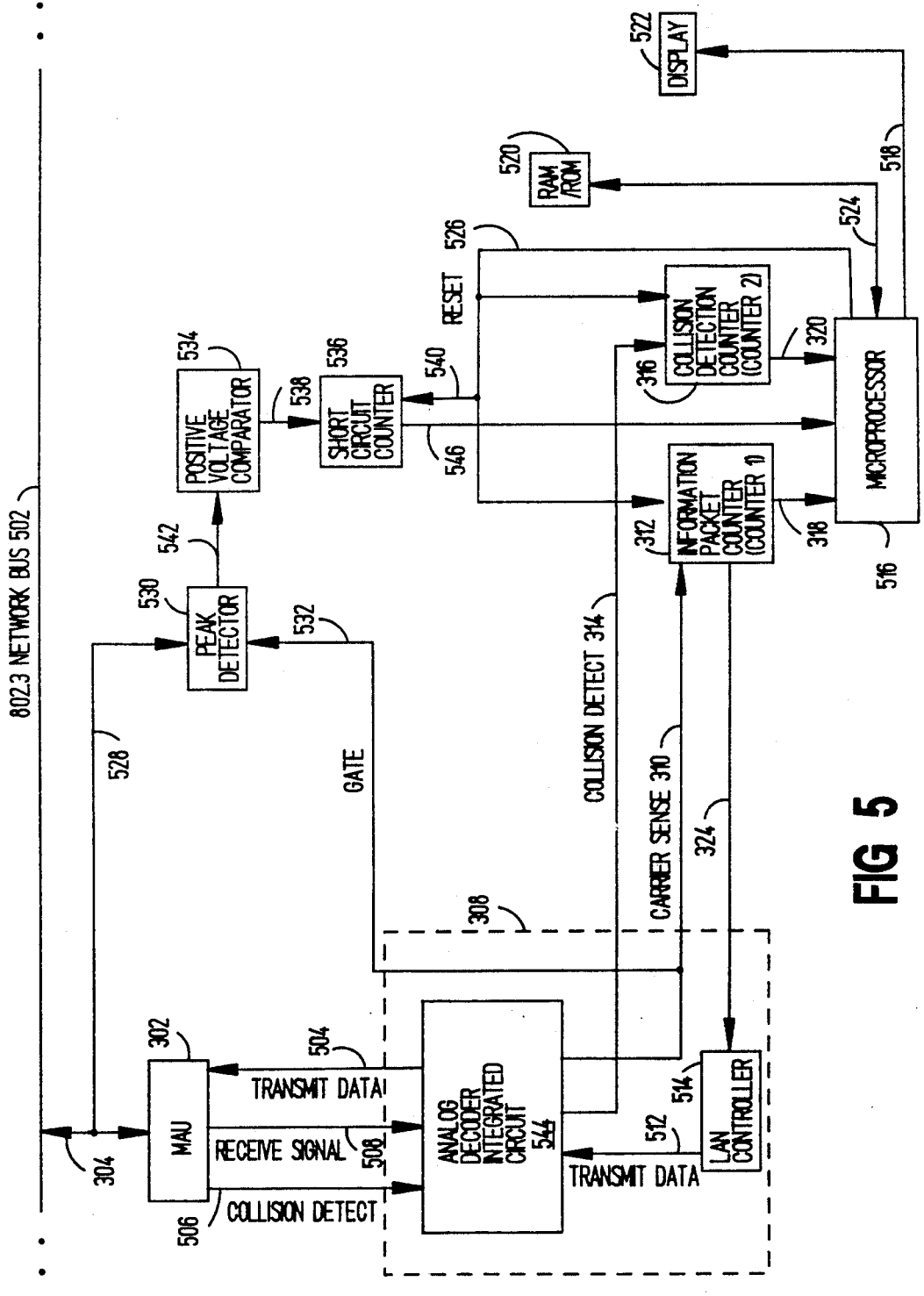
FIG. 5 is a block diagram of embodiments of the present invention for detecting an improperly terminated network and for detecting a network having a short circuit.

A more detailed embodiment of the present invention is now described with regard to FIG. 5. Referring to FIG. 5, the type of network bus 502 contemplated for use with some embodiments of the present invention is the network designated 802.3 by the Institute of Electrical and Electronic Engineers (IEEE). As discussed above, data line 304 is used to connect the present invention with the network bus 502. The data line 304 is again attached to a MAU 302, which some embodiments of the present invention contemplate to be an HP 28641A unit from Hewlett Packard Company of Palo Alto, Calif.

The MAU 302, as contemplated by embodiments of the present invention, is envisioned to have three other data lines in addition to the one connecting it with the network bus 502. The first data line 506 is used to signify a collision detection. This data line is thus set to "true" if a "damaged" information packet is detected on the network bus 502 (which appears to have been involved in a collision). As discussed above, this is typically detected where negative voltage on the network bus 502 greater than that for a normal information packed is observed.

The second data line 508 signifies a received signal, and is "true" when any type of information packet (damaged or otherwise) is detected on network bus 502. Data line 504 is for the transmission of data from the present invention to the network bus 502, and will be discussed further below.

In embodiments of the present invention, the network interface device 308 is shown as two other components. The first is an Analog Decoder Integrated Circuit 544, which converts the analog signal from the MAU 302 into digital signals which are utilized by the rest of the present invention. This circuit 544 also converts digital data received by other portions of the present invention into analog data which is sent to the MAU 302 via data line 504. Some embodiments of the present invention contemplate that the Analog Decoder Integrated Circuit 544 is an AMD 7992 chip produced by Advanced Micro Devices of Sunnyvale, CA.

When an information packet is detected on the network bus 502 and the receive signal 508 is "true," then the Analog Decoder Integrated Circuit 544 will send a signal via data line 324, indicating "carrier sense" (i.e., that an information packet has been detected). When this is the case, counter 1 (312) is incremented. Similarly, when an information packet which appears to have been in a collision is detected and data line 506 is "true," then the Analog Decoder Integrated Circuit 544 sends a signal to counter 2 (316) via data line 310 in order to increment this counter. Some embodiments of the present invention contemplate that both of these counters are 74LS590 chips made by Texas Instruments of Dallas, TX.

A microprocessor 516 controls the comparison of counter 1 (312) and counter 2 (316). Thus, a specified period of time is set using the microprocessor 516, after which the microprocessor reads in the number of times that counter 1 (312) and counter 2 (316) have been incremented. Embodiments of the present invention contemplate that this is done utilizing software which is on the ROM/RAM 520, attached to the microprocessor 516 via a data bus 524. Of course, it should be understood that hardware could also be implemented for this purpose.

If the two counters are found to be identical, then an "open" signal is generated, indicating that the network is not properly terminated. Embodiments of the present invention contemplate that a signal is sent to a display 522 via a data line 518. This display could be any type of output device, such as a printer or a cathode ray tube.

In some embodiments of the present invention, the microprocessor 516 also detects if no information packets were detected on the network bus 502 at all over some specified period of time. As indicated above, this could mean that the network is faulty and that all devices attached to the network have given up trying to communicate with one another.

In order to account for the above-mentioned possibility, the microprocessor 516 waits a specified period of time, and then checks counter 1 (312) to see if it has not been incremented at all. If that is the case, then the microprocessor 516 will send a signal to a LAN controller 514 via a data line 324 to send information packets onto the network bus 502 itself. Embodiments of the present invention contemplate that this LAN controller 514 sets up all the necessary protocol information for sending information packets in an appropriate format for an 802.3 network bus. In some embodiments of the present invention, it is contemplated that this LAN controller 514 is an AMD 7990 chip from Advanced Micro Devices. In any event, the information packets will be sent via a data line 512 to the Analog Decoder Integrated Circuit 544, which then sends the information packets via data line 504 to the MAU 302, which then sends the information packets to the network bus 502.

Once these information packets have been placed onto the network bus 502 by the present invention, the present invention then utilizes its information packet detection and collision detection resources to see if all of the information packets which were sent out on the network bus 502 are detected as collisions. This is done in the same way as discussed above. Again, if the end result is that counter 1 (312) and counter 2 (316) have been incremented by the same amount, then the network has not been terminated properly, and an error message will result.

Embodiments of the present invention contemplate that at least before each use of the present invention, all of the counters are reset by the microprocessor 516. This is done via a data line 526.

III. Short Circuit Detection

Embodiments of the present invention also contemplate detection of a short circuit on the network bus 502. Some of these embodiments contemplate that this is accomplished by utilization of some of the techniques described above for detecting an improperly terminated network. Those techniques to be utilized will become apparent by the following discussion, and by continued reference to FIG. 5.

Embodiments of the present invention contemplated for use in detecting a short circuit include a peak detector 530, which is connected to the network bus 502 via a data line 528 and data line 304. This peak detector 530 has the function of maintaining the highest (positive) peak voltage that it receives via data line 52 during the duration that the data line 532 (designated "gate") is "true." Thus, if data line 532 is "true" for 5 microseconds, and after three microseconds a voltage of +2 volts is received via data line 528, then if in the remaining two microseconds the voltage on data line 528 drops below +2 volts, the peak detector 530 will nonetheless maintain a constant voltage of +2 volts over data line 542.

In the present invention, because the data line 532 is attached to the carrier sense data line 324 (which is "true" during the entire time that the present invention is detecting an information packet), the peak detector 530 will be sampling voltages from the network bus 502 for the entire duration that an information packet is detected. It should be noted that even where a short circuit has occurred and an information packet is found to have a peak positive voltage, at some point during the transmission of the information packet the voltage will drop below zero. This will thus trigger the MAU 302 to generate a true signal along data line 508, indicating that a signal (i.e., an information packet) is passing through the network bus 502.

Embodiments of the present invention contemplate that the circuit comprising the peak detector 530 can be found on page 247 of "The Art Of Electronics," by Horowitz & Hill (1980), published by The Cambridge University Press, which is incorporated by reference herein.

A peak voltage comparator 534, which is receptive to the peak detector 530 via data line 542 is contemplated by embodiments of the present invention to be a circuit which will send a "true" signal via a data line 538 if a specified voltage is obtained. Thus, if the positive voltage comparator 534 is set for +2 volts, then if the peak detector 530 generates that amount of voltage or greater, the positive voltage comparator 534 will generate a "true" signal via data line 538. However, it is desired that the positive voltage comparator 534 generate such a signal only once per information packet. Thus, once the voltage from the peak detector 530 has reached the threshold point for the positive voltage comparator 534 so that it generates a "true" signal, the positive voltage comparator 534 is designed to generate another true signal only after the peak detector 530 generates a voltage less than this threshold amount, and subsequently generates a voltage again greater than the threshold amount. According to the design of the peak detector 530, this would only occur after the data line 532 goes back to "false" and then to "true" again.

Embodiments of the present invention contemplate that the positive voltage comparator 534 is a 741 operational amplifier made by Motorola corporation of Phoenix, AZ.

A short circuit counter 536 receives the "true" signal from the positive voltage comparator 534 via a data line 538. This short circuit counter 536 in effect counts the number of information packets which are indicative of a short circuit in the network bus 502. After some specified period of time, the short circuit counter 536 is compared with counter 1 (312), which, as discussed above, counts the number of information packets (of any kind) that are detected by the present invention. The microprocessor 516 waits a specified period of time before it compares short circuit counter 536 via a data line 546 with counter 1 (312) via a data line 318. If the microprocessor 516 determines that these two counters have been incremented by the same number, this means that all of the information packets detected have positive peak voltages, which means that the network bus 502 is short circuited. A "short circuit" signal is then contemplated to be generated by the microprocessor 516, which is then sent to some type of display 522 via data line 518.

Although the embodiments of the present invention which discuss the detection of a short circuit are shown here utilizing detailed components of the circuit for detecting improper termination the network, it should be understood that the embodiments for detecting a short circuit could also be utilized using the components discussed above with regard to FIG. 3. It should also be understood that, except for the specific components mentioned, the embodiments of the present invention which relate to detection of a short circuit of a network do not need to utilize the rest of the circuitry of the "improper termination" embodiments. The fact that both embodiments are shown in FIG. 5 merely shows that both embodiments can advantageously share resources.

Figure 6:
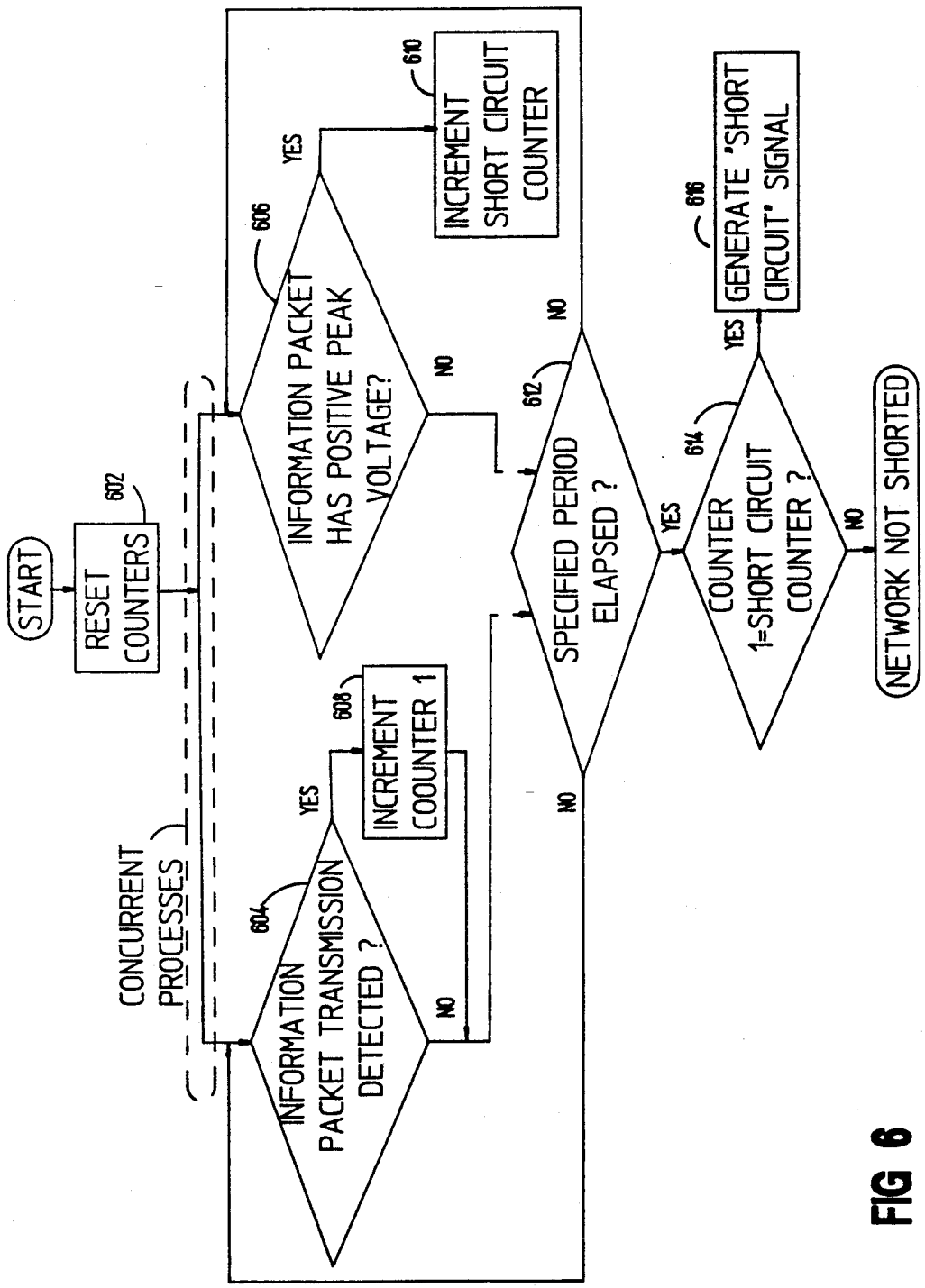
FIG. 6 is a flowchart of embodiments of the present invention for detecting a short circuit in a network.

Embodiments of a method of operation of the present invention are described using the flow chart of FIG. 6. Referring to FIG. 6, the counters are reset, as shown by a block 602. Information packet transmission generally is then detected concurrently with whether an information packet has a positive peak voltage. If an information packet transmission is detected, then counter 1 is incremented, as indicated by a decision block 604 and a block 608. If an information packet having a positive peak voltage is detected, then a short circuit counter is incremented, as indicated by a decision block 606 and a block 610.

If a specified period has not yet elapsed (that is, the present invention wants to continue to sample the network for a longer period of time), then the operational flow discussed above continues, as indicated by a decision block 612. If, however, the specified period has elapsed, a determination is made as to whether counter 1 is equal to the short circuit counter (where the counters are not equal to zero) as indicated by decision block 614. If they are equal, then a "short circuit" signal is generated, as indicated by a block 616. If they are not equal, then the network is not shorted.

The software utilized on the ROM/RAM 520 as discussed above can be derived from the following listing, from which source code and machine code are derivable. Comments are indicated after the # symbol at the right. In at least one embodiment of the present invention, the source code derivable from this listing is in the C programming language:

| | |
|---|---|
| OpenTerm = 0 | # Initialize Open Termination Result |
| Timer1 = 1 | # Initialize 10 Second Timer |
| ShortTerm = 0 | # Initialize Shorted Termination Results |
| main( ) | # start of control program |
| Reset Timer 1 | # Clear 10 second timer |
| Start Timer1 | # Run 10 second terminal count timer |
| while (!Timer1) | # Wait 10 seconds |
| { | |
| if (FCount = =0) | # See if any frames were received |
| txframe ( ); | # send frames to check status |
| } | |
| opendet ( ); | # calculate relationship of collision frames |
| shortdet ( ); | # calculate relationship of shorted frames |

```
            -continued
if (OpenTerm = 1);
    printf("The network is unterminated    n");
if (ShortTerm =1);
    printf("The network is shorted    n");
    printf("The network is not unterminated    n");
               # must not be shorted or unterminated
end program
txframe ( )              # Send frames subroutine
                         since no frames rcvd
    for (i=0, i<100,i++)  # Lets send 100 frames
    {
    Send frame;           # Send frame
    }
return
opendet ( )              # determination of open
                         termination LAN
    if (FCount/CCount ==1) # see if every frame had
                           a collision
    OpenTerm = 1         # if so then set
                         OpenTerm true
return
shortdet ( )             # determinations of
                         shorted network
    if (FCount/SCount ==1) # is every frame a
                           positive signal?
    ShortTerm = 1        # if so then set Shorted
                         Termination
return
```

It should be understood that the present invention can be implemented in hardware embodiments, software embodiments or some combination thereof. Any presently available or future developed computer software language or hardware devices can be employed in such software embodiments of the present invention.

It should also be understood that the present invention is not limited to the embodiments discussed above, and that the examples presented above are merely for the purposes of illustration. The scope of the present invention should therefore be interpreted by the following claims as defined by the forgoing figures and text.

What is claimed is:

1. A system for detecting whether a network, using a collision detection access scheme to transmit information packets, is improperly terminated, comprising:
   first counter means, responsive to the network, for counting the number of information packets transmitted over a first specified period of time;
   second counter means, responsive to the network, for counting the number of information packets which appear damaged over said first specified period of time; and
   comparator means for comparing the number counted by said first counter means with the number counted by said second counter means after the expiration of said first specified period of time,
   wherein an "open termination " signal is generated when the number counted by said first counter means and the number counted by said second counter means are identical.

2. The system of claim 1, further comprising backup check means for transmitting a plurality of test information packets to the network when said first counter means does not count any information packets transmitted over a second specified period of time,
   wherein said first counter means counts the number of information packets transmitted over a third specified period of time and wherein said second counter means counts the number of damaged information packets transmitted over said third specified period of time, and
   wherein said comparator means compares the number counted by said first counter means with the number counted by aid second counter means after the expiration of said third specified period of time, and wherein an "open-termination " signal is generated when the number counted by said first counter means and the number counted by said second counter means are identical.

3. The system of claim 2, wherein said backup check means utilizes said comparator means and a LAN controller for generating and transmitting said test information packets.

4. The system of claim 1, wherein a network interface device issued to control said first and second counter means.

5. A system for detecting whether a network, using a collision detection access scheme to transmit information packets, has a short circuit, comprising:
   first counter means, responsive to the network, for counting the number of information packets transmitted over a specified period of time;
   second counter means, responsive to the network, for counting the number of information packets having positive peak voltages over said specified period of time; and
   comparator means for comparing the number counted by said first counter means with the number counted by said second counter means after the expiration of said specified period of time,
   wherein a "short circuit " signal is generated when the number counted by said first counter means and the number counted by said second counter means are identical.

6. The system of claim 5, further comprising peak detector means and positive voltage comparator means, responsive to the network, for sending a signal to said second counter means causing said second counter to increment, wherein said peak detector means and said positive voltage comparator means send a single signal to said second counter means for each positive peak voltage above a specified threshold value detected on the network.

7. The system of claim 6, wherein said peak detector means is activated by the detection of an information packet on the network.

8. The system of claim 6, wherein a network interface device is used to control said first counter means.

9. The system of claim 8, wherein said network interface device comprises an analog decoder integrated circuit.

10. A method for detecting whether a network, using a collision detection access scheme to transmit information packets, is improperly terminated, comprising the steps of:
    (1) concurrently detecting information packet transmissions and damaged information packets on the network;
    (2) incrementing a number on a first counter upon detection of an information packet transmission, and incrementing a number on a second counter upon detection of a damaged information packet;
    (3) determining whether a first specified period has elapsed, and re-executing said steps (1)–(3) where said first specified period has not elapsed;
    (4) comparing the number incremented on said first counter with the number incremented on said second counter, and generating a signal indicating improper termination of the network when the number incremented on said first counter and the number incremented on aid second counter are identical.

11. The method of claim 10, further comprising the steps after said step (4) of:
   (5) determining whether a second specified period of time has elapsed, and re-executing said steps (1)–(4) where said second specified period has not elapsed;
   (6) transmitting a plurality of test information packets to the network;
   (7) re-executing said steps (1) and (2), until a third specified period has elapsed;
   (8) comparing the number incremented on said first counter with the number incremented on said second counter, and generating a signal indicating improper termination of the network when the number incremented on said first counter and the number incremented on said second counter are identical.

12. The method of claim 11, wherein said step (6) comprises the step of transmitting said plurality of test information packets to the network using a LAN controller to set up the necessary protocol information for transmitting the test information packets onto the network.

13. The method of claim 10, wherein said step (1) comprises the step of detecting a drop in voltage in the network to determine the transmission of information packets.

14. The method of claim 10, wherein said step (4) comprises the step of using a comparator to compare to number incremented on said first counter with the number incremented on said second counter.

15. A method for detecting whether a network, using a collision detection access scheme to transmit information packets, has a short circuit, comprising the steps of:
   (1) concurrently detecting information packet transmissions and information packets having positive peak voltages on the network;
   (2) incrementing a number on a first counter upon detection of an information packet transmission, and incrementing a number on a short circuit counter upon detection of an information packet having a positive peak voltage;
   (3) determining whether a specified period has elapsed, and re-executing said steps (1)–(3) when said specified period has not elapsed;
   (4) comparing the number incremented on said first counter with the number incremented on said short circuit counter, and generating a signal indicating a short circuit in the network when the number incremented on said first counter and the number incremented on said short circuit counter are identical.

16. The method of claim 15, wherein said step (1) comprises the step of detecting information packet transmissions using a network interface device.

17. The method of claim 15, wherein said step (1) comprises the step of detecting information packets having positive peak voltages using a peak detector and positive voltage comparator.

* * * * *

UNITED STATES PATENT AND TRADEMARK OFFICE
CERTIFICATE OF CORRECTION

PATENT NO. : 5,179,341
DATED : January 12, 1993
INVENTOR(S) : Charles H. Whiteside It is certified that error appears in the above-identified patent and that said Letters Patent is hereby corrected as shown below:

Col. 12, line 3 - "aid" to --said--

Col 13, line 2 - "aid" to --said--

Signed and Sealed this

Twenty-fourth Day of January, 1995

Attest:

BRUCE LEHMAN

Attesting Officer        Commissioner of Patents and Trademarks